Feb. 17, 1970  W. J. MURGAS  3,495,799
Y-SHAPED CLAMPING RUBBER FOR FENDER MOUNTED REARVIEW MIRRORS
Filed Jan. 17, 1968
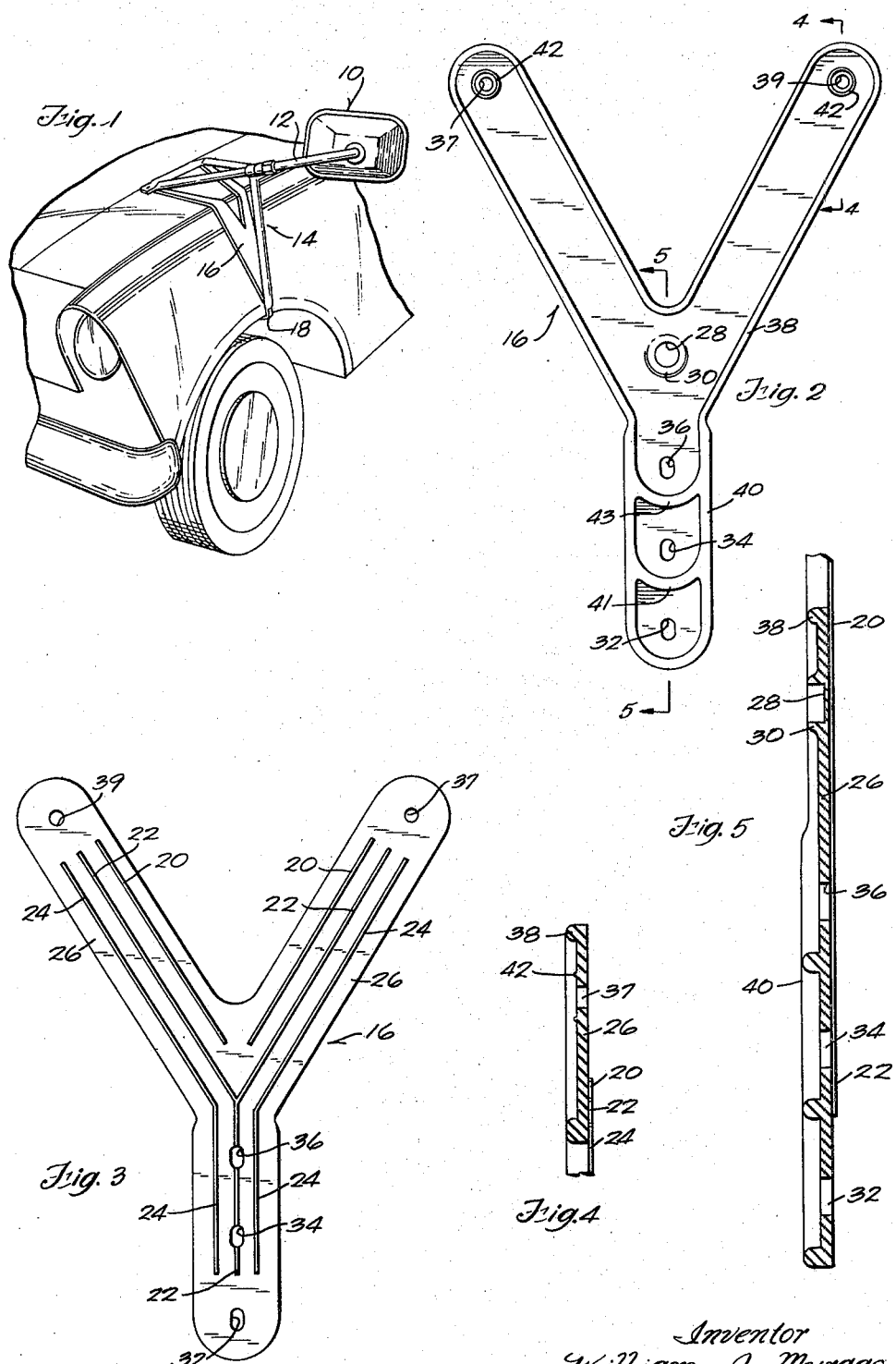
Inventor
William J. Murgas
By Gerrit W. Foster
Attorney

United States Patent Office 3,495,799
Patented Feb. 17, 1970

3,495,799
Y-SHAPED CLAMPING RUBBER FOR FENDER MOUNTED REARVIEW MIRRORS
William J. Murgas, Wauwatosa, Wis., assignor to Velvac Inc., Milwaukee, Wis., a corporation of Delaware
Filed Jan. 17, 1968, Ser. No. 698,462
Int. Cl. A47g 1/16; A47f 7/14
U.S. Cl. 248—475
3 Claims

ABSTRACT OF THE DISCLOSURE

A Y-shaped clamping rubber for fender mounted rear view mirrors having: (1) longitudinally extending laterally spaced ridges on its fender facing side; (2) a section relief area in the large area of the rubber at the junction of the upper legs the base leg; (3) a plurality of spaced elongated holes in its base leg; and (4) a peripheral bead with raised arcuate ridges adjacent each elongated hold.

BACKGROUND OF THE INVENTION

Field of invention

This invention relates to Y-shaped clamping rubbers for detachable fender mounted supports for outside rear view mirrors of the type employed on passenger cars and small trucks while towing trailers, etc.

Description of the prior art

A fender mounted rear view mirror is shown in U.S. Patent 3,081,057, however it has no rubber clamp extending from the motor well hooks to the fender hooks.

No other prior art has come to the attention of applicant. The Y-shaped clamping rubber of his application S.N. 605,490, now Patent No. 3,395,883, which shows the general basic shape will be copending herewith and this is not considered prior art.

SUMMARY OF THE INVENTION

The essence of this invention is the provision of the Y-shaped clamping rubber which is so designed as to spread the tension when stressed equally throughout the length of the legs and central body of the Y-shape, and to prevent tearing of the openings by the fastening devices which secure the clamping rubber to the clamping feet and mirror mounting frame. This is accomplished by longitudinally spaced ridges on the fender facing side of the rubber clamp, by thinner relief area sections, peripheral beads and arcuate ridges adjacent each opening for the fastening members which ridges are engaged laterally by rubber coated metal washers which are mounted on the fastening members.

BRIEF DESCRIPTION OF THE DRAWING

In the drawing:

FIG. 1 is a fragmentary perspective view of a rear view mirror mounting held by a Y-shaped clamping rubber embodying the present invention;

FIG. 2 is a top plan view of such Y-shaped clamping rubber;

FIG. 3 is a bottom plan view of such clamping rubber;

FIG. 4 is a sectional view taken on the line 4—4 of FIG. 2; and

FIG. 5 is a sectional view taken on the line 5—5 of FIG. 2.

DESCRIPTION OF THE PREFERRED EMBODIMENT

Referring to the drawing by reference numbers the rear view mirror includes (a) a mirror head assembly 10 adjustably mounted on an extension 12, (b) a mounting indicated generally at 14, and (c) the improved Y-shaped clamping rubber 16.

The mounting 14 is of tripodal shape when extended for attaching to the fender of the vehicle. It is fully described in the aforesaid application. The upper ends of the mounting are provided with hood feet (not shown) which are bent to engage the inner face of the edge of the fender forming the motor well. No screws or other fastening means are used to secure such feet to such edge. Thus the motor hood can be opened and closed without disturbing the mounting 14. The lower end of the mounting is provided with a fender foot 18.

In order to maintain the fender foot 18 and hood feet in fender gripping position, the improved Y-shaped clamping rubber 16 has each of its legs secured to such feet and the ends of the tripodal mounting by fastening means which pass through the hereinafter described holes in such clamping rubber.

An important characteristic of this improved clamping rubber is the provision of raised ridges 20, 22 and 24 on the fender facing side 26 (see FIG. 3) of such clamping rubber. These ridges have relatively narrow tops and are spaced as shown. They extend longitudinally of the legs and central portion of such clamping rubber. Their heighth and spacing is such as to hold the fender facing surface of the clamping rubber out of significant friction producing engagement with the fender surface on which the clamping rubber is mounted. When the clamping rubber is stretched to mount it to a fender the friction resisting relative sliding is minimized by the ridges 20, 22 and 24 which form relatively small engagement areas between the face of the fender and the rubber surfaces. Thus the stretching will take place uniformly throughout each leg of the clamping rubber.

Another feature of the improved clamping rubber is the provision of a thin section relief area 28. This relief area is placed, as shown in FIG. 2, in the wide and larger cross-sectional area or central part of the junction of the three legs of the Y-shaped clamping rubber. As can be seen in FIG. 5 the thickness of this relief section 28 is less than one-fourth the thickness of the other parts of the web at this part. This relief area lessens the cross-sectional area so that stretching is made more uniform throughout all parts of clamping rubber. Such relief area may be surrounded by a bead 30 which will carry part of the stretch load without tearing effect on such relief area.

A further feature of the improved clamping rubber is the provision of a plurality such as three, elongated holes 32, 34 and 36 spaced as shown in the bottom or base leg of the Y-shaped clamping rubber 16. These holes provide selections for the fastening of the fender foot 18 at varying distances from the holes 37 and 39 for the fasteners for hood feet. Thus a single size clamping rubber may be used to create at least three different models of fender mounted rear view mirrors.

A still further feature of this improved clamping rubber is the peripherally extending bead 38 raised up from the topside thereof. This bead is sufficiently large in sectional area to carry a large portion of the stretch stress and eliminate undue stress on the thinner web section. As indicated at 40 the cross-sectional area of this bead along the edges of the base leg may be slightly larger than such area along the edges of the upper legs. This further equalizes the stretch absorption load throughout the entire clamping rubber.

As is clearly shown in FIG. 2, the beads 38 and 40 at the end of each leg are arcuate or circular in shape and are spaced radially equidistant from the holes for the fastening elements. Thus rubber coated washers (not shown) of the proper size when placed on the fastening elements will contact such arcuate parts and transfer stress from the mounting feet through the fastening elements to such bead. Semi-arcuate or semi-circularly shaped ridges 41 and 43 extend as shown between beads 40 on opposite sides of the base leg. They are also radially spaced from the holes 34 and 36 so that no matter which opening is selected the stress will be transferred as above described to the peripheral bead. This prevents tearing the holes for the fasteners for the hood and fender feet.

It has been found advantageous to encircle the holes 37 and 39 with strengthening ridges 42 which contact with rubber covered metal washers in distributing the stress and preventing tearing of the web around such holes.

This clamping rubber may be made of rubber having a durometer reading of at least 50 and a tensile strength of 2000 pounds.

I claim:

1. An improved Y-shaped clamping rubber for a fender mounted rear vew mirror comprising:
   a Y-shaped clamping rubber having a fender facing side and top side, a plurality of legs each of which extends from a large central area, and a thin section relief area in said large central area to equalize tension in the volume of rubber in such large central area with respect to the volume of rubber in said legs when said clamping rubber is mounted on a fender; and
   longitudinally extending laterally spaced ridges on said fender facing side, said ridges having a narrow top and being of a height sufficient to maintain the surface of said fender facing side between said ridges out of measurable frictional contact with the surface of a fender on which said clamping rubber is mounted.

2. An improved clamping rubber as set forth in claim 1 in which:
   said Y-shaped clamping rubber has a base leg; and
   there are a plurality of fastener receiving holes in said base leg spaced longitudinally therealong.

3. An improved clamping rubber as set forth in claim 1 in which:
   each of said legs has a fastener receiving hole therein; and
   there are arcuate raised portions on said top side adjacent each of said holes adapted to receive stress from washers mounted on fasteners inserted through said holes.

References Cited

UNITED STATES PATENTS

| | | | |
|---|---|---|---|
| 1,551,452 | 8/1925 | Arias | 248—350 |
| 3,142,469 | 7/1964 | Clemmer | 248—226 |

FOREIGN PATENTS 881,804  11/1961  Great Britain.

ROY D. FRAZIER, Primary Examiner

F. DOMOTOR, Assistant Examiner

U.S. Cl. X.R.

267—1